United States Patent [19]

Breant

[11] Patent Number: 5,032,321

[45] Date of Patent: Jul. 16, 1991

[54] FLAME-RETARDANT POLYMER COMPOSITIONS AND THEIR APPLICATION TO THE SHEATHING OF ELECTRICAL CABLES

[75] Inventor: Patrice Breant, Robecq, France

[73] Assignee: Norsolor (ORKEM Group), Paris La Defense, France

[21] Appl. No.: 528,077

[22] Filed: May 24, 1990

[30] Foreign Application Priority Data

May 25, 1989 [FR] France ................ 89 06847

[51] Int. Cl.$^5$ .............................. C09K 21/00
[52] U.S. Cl. .................... 252/609; 106/18.11;
428/364; 174/110 AR; 174/121 A
[58] Field of Search ............... 252/609; 106/18.11;
428/364; 174/110 AR, 121 A

[56] References Cited

U.S. PATENT DOCUMENTS

| | | | |
|---|---|---|---|
| 4,059,561 | 11/1977 | Arai et al. | 528/82 |
| 4,124,400 | 11/1978 | Morgan et al. | 106/15 FP |
| 4,410,648 | 10/1983 | Kato et al. | 524/101 |

Primary Examiner—Robert L. Stoll
Assistant Examiner—Nina Bhat
Attorney, Agent, or Firm—Millen, White & Zelano

[57] ABSTRACT

Flame-retarded polymer compositions comprising a hydrated inorganic filler, at least one ethylene/alkyl (meth)acrylate copolymer and at least one copolymer of ethylene and of at least one α-olefin, which compositions consist essentially of 120 to 240 parts by weight of hydrated inorganic filler per 100 parts by weight of a polymer phase consisting of:

(a) 30 to 75 parts by weight of at least one ethylene-/alkyl (meth)acrylate copolymer (A) having a content of alkyl (meth)acrylate of between 1 and 50 mol %, (b) 10 to 30 parts by weight of at least one ethylene-/alkyl (meth)acrylate/unsaturated dicarboxylic acid anhydride terpolymer (B), (c) 5 to 55 parts by weight of at least one copolymer of ethylene and of at least one α-olefin (C) having a density of between 0.865 and 0.915 and a degree of crystallinity equal to at least 5%, and (d) 0 to 5 parts by weight of at least one low-density polyethylene (D).

Industrial articles comprising such a flame-retarded polymer composition.

17 Claims, No Drawings

FLAME-RETARDANT POLYMER COMPOSITIONS AND THEIR APPLICATION TO THE SHEATHING OF ELECTRICAL CABLES

BACKGROUND OF THE INVENTION

The present invention relates to flame-retardant polymer compositions containing ethylene copolymers. More especially, these compositions do not contain halogenated derivatives and are capable of being processed by conventional techniques into articles having good fire resistance, such as, in particular, insulating sheathings for electrical cables.

Improvement of the fire resistance of compositions containing polymer materials is a constant objective of the manufacturers and processors of these materials, directed towards obtaining a significant reduction in the inflammability and capacity for flame propagation of these materials. The use of halogenated derivatives as flame-retardant agents is well known, but has the great drawback of leading, on combustion, to toxic and corrosive gases. The manufacturers and processors have hence turned their attention to the development of compositions containing oxides, hydroxides or inorganic salts of metals, such as hydrated alumina and magnesium hydroxide.

However, the addition of such inorganic fillers in a sufficient amount to obtain good fire resistance leads to materials having mediocre mechanical properties and-/or presenting great difficulties of processing by conventional methods such as extrusion. Thus, the addition of large amounts of hydrated alumina to an ethylene/alkyl (meth)acrylate copolymer leads to a composition whose mechanical properties are greatly inferior to those of said copolymer.

SUMMARY OF THE INVENTION

The problem which the present invention aims to solve is to define polymer compositions flame-retardant by means of compounds such as hydrated alumina or magnesium hydroxide and which simultaneously possess good fire resistance and mechanical properties and an ease of processing which are acceptable, that is to say not excessively decreased relative to those of compositions not containing a flame-retardant agent. The different constituents must provide for the achievement of good compatibility with the inorganic filler.

This problem may be solved by means of the compositions according to the invention.

A first aspect of the present invention relates to flame-retarded polymer compositions comprising a hydrated inorganic filler, at least one ethylene/alkyl (meth)acrylate copolymer and at least one copolymer of ethylene and of at least one α-olefin, which compositions consist essentially of 120 to 240 parts by weight of a hydrated inorganic filler per 100 parts by weight of a polymer phase comprising:

a) 30 to 75 parts by weight of (A): at least one ethylene/alkyl (meth)acrylate copolymer having a content of alkyl (meth)acrylate of between 1 and 50 mol %, b) 10 to 30 parts by weight of (B): at least one ethylene/alkyl (meth)acrylate/unsaturated dicarboxylic acid anhydride terpolymer, c) 5 to 55 parts by weight of (C): at least one copolymer of ethylene and of at least one α-olefin (C) having a density of between 0.865 and 0.915 and a degree of crystallinity equal to at least 5%, and d) 0 to 5 parts by weight of (D): at least one low-density polyethylene.

As examples of hydrated inorganic fillers which are usable in the compositions according to the invention, there may be mentioned aluminum hydroxide $Al(OH)_3$ and magnesium hydroxide $Mg(OH)_2$, and hydrated carbonates such as hydrated calcium magnesium carbonate, for example of average particle size advantageously between 0.5 and 2 µm.

The ethylene/alkyl (meth)acrylate copolymers (A) are generally obtained by copolymerization, under high pressure and at high temperature in the presence of free-radical initiators, of ethylene and at least one ester of acrylic acid or of methacrylic acid selected, in particular, from methyl acrylate, ethyl acrylate, n-butyl acrylate and methyl methacrylate. They advantageously contain 5 to 35 mol % approximately of alkyl (meth)acrylate.

Ethylene/alkyl (meth)acrylate/unsaturated dicarboxylic acid anhydride terpolymer (B) is preferably understood, according to the present invention, to mean a compound comprising:

83 to 98.7 mol % of units derived from ethylene, 1 to 14 mol % of units derived from at least one ester of acrylic and/or methacrylic acid, and 0.3 to 3 mol % of units derived from an unsaturated dicarboxylic acid anhydride such as, for example, maleic anhydride.

The melt flow index of the terpolymer (B), measured under the standard conditions (190° C., 2.16 kg load) of ASTM Standard 1238, is advantageously between 1 and 10 dg/min.

This terpolymer may be obtained, for example, under the conditions described in the documents FR-A-2,498,609, FR-A-2,569,411 and FR-A-2,569,412. The ester of acrylic or methacrylic acid preferably contains an alkyl group having 1 to 8 carbon atoms. By way of examples, methyl, ethyl, n-propyl, isopropyl, n-butyl, isobutyl, n-pentyl, n-hexyl, 2-ethylhexyl, n-octyl and cyclohexyl acrylates and methacrylates may be mentioned.

The copolymer (C) of ethylene and of at least one α-olefin is obtained by copolymerization in the presence of Ziegler-type catalytic systems. It generally has a standard melt flow index (as defined above) of between 1 and 5 dg/min.

The low-density polyethylene (D) is obtained by the homopolymerization of ethylene at high temperature (generally 140° to 350° C.) and under high pressure (generally 1,000 to 4,000 bars) in the presence of a free-radical initiator (such as oxygen, peroxides or peresters). Its density is generally between 0.915 and 0.935 and it has a standard melt flow index (as defined above) advantageously of between 1 and 10 dg/min.

Among the compositions according to the invention, those which contain:

(a) 30 to 55 parts by weight of copolymer (A)

b) 20 to 30 parts by weight of terpolymer (B)

c) 15 to 45 parts by weight of copolymer (C)

d) 0 to 3 parts by weight of polyethylene (D) per 100 parts by weight of polymer phase are especially advantageous.

Those which contain, per 100 parts by weight of polymer phase:

a) 40 to 55 parts by weight of copolymer (A)

b) 25 to 30 parts by weight of terpolymer (B)

c) 25 to 40 parts by weight of copolymer (C) are more especially preferred.

The composition according to the invention generally have a limiting oxygen index (as defined below) of at least 40%, an elongation at break of at least 100% and a rupture strength of at least 10 MPa, and moreover a complete resistance to dripping (simulation test on sheets).

The compositions according to the invention may be prepared by kneading the ingredients in powder or granule form so as to obtain a homogeneous, ready-to-use mixture.

They may also be prepared by kneading and then melting and granulation of the constituents of the polymer phase. The granules obtained are then kneaded with the desired amount of flame-retardant agent with the object of providing a homogeneous, ready-to-use mixture.

Finally, the compositions may be prepared by kneading all the constituents, those of the polymer phase being in the molten state, followed by extrusion and granulation. The extrusion may also be carried out on a co-extruder; the compositions in which the polymer phase is in the molten state and the hydrated inorganic filler regularly dispersed may then be processed directly, for example into sheathing for metal cables.

A second aspect of the present invention relates to industrial articles comprising a composition as described above. More especially, these industrial articles are sheathings for electrical cable.

In order to avoid hot flow, it is advantageous, in particular in the manufacture of sheathings for electrical cables, to perform crosslinking of the compositions according to the invention. This crosslinking is carried out by adding a sufficient amount of crosslinking agent to avoid flow at the processing temperature envisaged (for example approximately 80° C. for power cables). The crosslinking agent is selected, in particular, from peroxides and ethylenically unsaturated silanes such as vinyl trimethoxysilane (in a first stage the compound is grafted onto the polyethylene chain, and in a second stage crosslinking takes place through the action of water to form Si-O-Si bridges between two molecules), the epoxide derivatives acting by reaction with the anhydride functions of the terpolymer (B).

Apart from this application in cable manufacture, the compositions according to the invention find other applications in which their character of fire resistance and their good mechanical properties are required. They have the advantage that they can be processed into industrial articles (sheets, plates, profiles, hollow bodies, tubes, pipes) having improved fire resistance, by the conventional techniques for processing polyolefins (extrusion, injection, rotational molding).

The object of the examples which follow is to illustrate the invention without implied limitation.

EXAMPLES

All the compositions are prepared by producing a mixture of the different constituents in the powder or granule state in an internal mixer in which the polymer constituents are molten, and then extruding the mixture by means of a twin-screw extruder at a temperature of 145° C. All contain 168 parts by weight of hydrated alumina Al(OH)$_3$ of average particle size 0.5 μm.

The following properties are measured on the extruded compositions:

the rupture strength (RS) determined according to ASTM Standard D-638 and expressed in megapascals (MPa), the elongation at break (EB) determined according to ASTM Standard D-638 and expressed in %, the limiting oxygen index (LOI) determined according to ASTM Standard D-2863 and expressed in %.

EXAMPLES 1 to 4 (comparative)

The compositions were prepared using, apart from the above filler, the following polymer constituents:

(A) an ethylene/methyl acrylate copolymer having a content of 30% by weight of methyl acrylate and a melt flow index (measured according to ASTM Standard D-1238 at 190° C. under a 2.16 kg load) equal to 2 dg/min, marketed by the company NORSOLOR under the name LOTRYL 3610, (B) an ethylene/n-butyl acrylate/maleic anhydride terpolymer containing 97.8 mol % of units derived from ethylene, 1.2 mol % of units derived from n-butyl acrylate and 1 mol % of units derived from maleic anhydride, marketed by the company NORSOLOR under the name LOTADER 3200, (C) an ethylene/1-butene copolymer having a density of 0.900 and a melt flow index (measured according to ASTM Standard D-1238 at 190° C. under a 2.16 kg load) of 1 dg/min, marketed by the company NORSOLOR under the name NORSOFLEX FW 1900.

Table I shows the amounts in parts by weight of constituents used for preparing the compositions, and the results of measurement of their properties.

None of the control compositions simultaneously possesses a set of satisfactory properties. In particular, their elongation at break or their rupture strength is inadequate for the applications envisaged.

TABLE I

| Example | (A) | (B) | (C) | RS | EB | LOI |
|---|---|---|---|---|---|---|
| 1 | 100 | — | — | 7.5 | 215 | 38 |
| 2 | — | 100 | — | 17 | 70 | 40 |
| 3 | — | — | 100 | 5 | 120 | 35 |
| 4 | 50 | — | 50 | 9 | 145 | 39 |

EXAMPLES 5 to 9

The same constituents were used as in Comparative Examples 1 to 4, according to the amounts appearing in Table II in parts by weight.

The results of the measurements performed also appear in Table II.

TABLE II

| Example | (A) | (B) | (C) | RS | EB | LOI |
|---|---|---|---|---|---|---|
| 5 | 55 | 30 | 15 | 11 | 140 | 42 |
| 6 | 45 | 25 | 30 | 11 | 145 | 41 |
| 7 | 30 | 25 | 45 | 11 | 140 | 39 |
| 8 | 35 | 30 | 35 | 12 | 135 | 40 |
| 9 | 40 | 20 | 40 | 11 | 145 | 40 |

I claim:

1. A flame-retardant polymer composition consisting essentially of 120 to 240 parts by weight of hydrated inorganic filler per 100 parts by weight of a polymer phase comprising:

(a) 30 to 75 parts by weight of (A) at least one ethylene/alkyl (meth)acrylate copolymer having a content of alkyl (meth)acrylate of between 1 and 50 mol %, (b) 10 to 30 parts by weight of (B) at least one ethylene/alkyl (meth)acrylate/unsaturated dicarboxylic acid anhydride terpolymer, (c) 5 to 55 parts by weight of (C) at least one copolymer of ethylene and of at least one α-olefin having a density of between 0.865 and 0.915 and a degree of crystallinity equal to at least 5%, and (d) 0 to 5 parts by weight of (D) at least one low-density polyethylene.

2. A composition according to claim 1, which contain per 100 parts by weight of polymer phase:
 a) 30 to 55 parts by weight of copolymer (A)
 b) 20 to 30 parts by weight of copolymer (B)
 15 to 45 parts by weight of copolymer (C)
 d) 0 to 3 parts by weight of polyethylene (D).

3. A composition according to claim 1, which contain, per 100 parts by weight of polymer phase:
 a) 40 to 50 parts by weight of copolymer (A)
 b) 25 to 30 parts by weight of terpolymer (B)
 c) 25 to 40 parts by weight of copolymer (C).

4. A composition according to claim 3, in which the hydrated inorganic filler is hydrated alumina used in the proportion of 168 parts by weight per 100 parts of polymer phase.

5. A composition according to claim 3, in which the copolymer (A) contains approximately 5 to 35 mol % of units derived from alkyl (meth)acrylate.

6. A composition according to claim 5, in which the terpolymer (B) comprises:
 83 to 98.7 mol % of units derived from ethylene,
 1 to 14 mol % of units derived from at least one ester of acrylic and/or methacrylic acid, and
 0.3 to 3 mol % of units derived from an unsaturated dicarboxylic acid anhydride.

7. A composition according to claim 1, in which the terpolymer (B) has a standard melt flow index of between 1 and 10 dg/min.

8. A composition according to claim 6, in which the copolymer (C) has a standard melt flow index of between 1 and 5 dg/min.

9. A composition according to claim 1, which possess a limiting oxygen index equal to at least 40%, an elongation at break equal to at least 100% and a rupture strength equal to at least 10 MPa.

10. A composition according to claim 1, further comprising a sufficient amount of crosslinking agent to avoid flow at processing temperatures.

11. A shaped article of manufacture comprising a composition according to claim 1.

12. An article of manufacture being an electrical cable comprising a sheathing, said sheathing comprising a composition according to claim 1.

13. An article of manufacture being an electrical cable comprising a sheathing, said sheathing comprising a composition according to claim 9.

14. An article of manufacture being an electrical cable comprising a sheathing, said sheathing comprising a composition according to claim 10.

15. A composition according to claim 10, wherein said crosslinking agent is a peroxide or an ethylenically unsaturated silane.

16. A composition according to claim 10, wherein said crosslinking agent is vinyl trimethoxysilane.

17. A composition according to claim 1, wherein the hydrated inorganic filler is hydrated alumina, magnesium hydroxide, or hydrated calcium magnesium carbonate.

* * * * *